(12) United States Patent
Wolf

(10) Patent No.: US 11,970,032 B1
(45) Date of Patent: Apr. 30, 2024

(54) VEHICLE TOWING DEVICE AND MECHANISM FOR WHEELIE BIN AND REFUGE CONTAINERS

(71) Applicant: James Larry Wolf, El Cajon, CA (US)

(72) Inventor: James Larry Wolf, El Cajon, CA (US)

(*) Notice: Subject to any disclaimer, the term of this patent is extended or adjusted under 35 U.S.C. 154(b) by 17 days.

(21) Appl. No.: 18/347,327

(22) Filed: Jul. 5, 2023

(51) Int. Cl.
*B60D 1/07* (2006.01)
*B60D 1/04* (2006.01)
*B60D 1/145* (2006.01)
*B60D 1/52* (2006.01)

(52) U.S. Cl.
CPC ............... *B60D 1/07* (2013.01); *B60D 1/04* (2013.01); *B60D 1/145* (2013.01); *B60D 1/52* (2013.01)

(58) Field of Classification Search
CPC . B60D 1/07; B60D 1/04; B60D 1/145; B60D 1/52
See application file for complete search history.

(56) References Cited

U.S. PATENT DOCUMENTS

| | | | | |
|---|---|---|---|---|
| 4,398,745 A * | 8/1983 | Azzarello | ............... | B60D 1/04 280/508 |
| 6,698,995 B1 * | 3/2004 | Bik | ............... | B65F 1/1473 224/547 |
| 7,101,142 B2 * | 9/2006 | Bik | ............... | B65F 1/1468 224/521 |
| 7,614,637 B1 * | 11/2009 | Kidd | ............... | B60D 1/00 280/480 |
| 8,505,951 B2 * | 8/2013 | Bohse | ............... | B60D 1/58 280/491.1 |
| 9,085,207 B1 * | 7/2015 | Sweet | ............... | B60D 1/24 |
| 9,586,637 B2 * | 3/2017 | Kentner | ............... | B62D 63/064 |
| 9,789,741 B1 * | 10/2017 | Marling | ............... | B60D 1/52 |
| 10,960,824 B2 * | 3/2021 | Wagner | ............... | B65F 1/1468 |
| 2004/0164517 A1 * | 8/2004 | Lewy | ............... | B60D 1/145 280/493 |
| 2005/0161906 A1 * | 7/2005 | Thelen | ............... | B60D 1/00 280/504 |
| 2007/0170218 A1 * | 7/2007 | Robb | ............... | B60R 9/06 224/533 |
| 2009/0101685 A1 * | 4/2009 | Robb | ............... | B60R 9/065 224/548 |
| 2009/0283987 A1 * | 11/2009 | Long | ............... | B65F 1/1468 280/498 |
| 2020/0290412 A1 * | 9/2020 | Robinson | ............... | B60D 1/36 |

* cited by examiner

*Primary Examiner* — Kevin Hurley
*Assistant Examiner* — Michael R Stabley

(57) ABSTRACT

A vehicle towing device and mechanism for wheelie bin and refuge containers preferably includes an interface attaching mechanism for securing the device to the vehicle using a lower horizontal component. This component can utilize the vehicle's towing receiver or be adapted for other attachment methods. The invention further comprising a tee-shaped intermediate assembly and further attaches to a refuge container to Interface attaching mechanism consisting of 2 primary parts made from a metal preferably aluminum or a polymer like material which may be effectively mirror images of each other and rotate about the horizontal round stock arm of the Tee Assembly in opposite directions to each other concurrently to surround the refuge container handle to securely attach the refuge container to the Tee Assembly.

6 Claims, 5 Drawing Sheets

VEHICLE TOWING DEVICE AND MECHANISM FOR WHEELIE BIN AND REFUGE CONTAINERS

BACKGROUND OF INVENTION

Waste management or waste disposal includes the processes and actions required to manage waste from its inception to its final disposal. This includes the collection, transport, treatment, and disposal of waste. In some cases, waste can pose a threat to human health. Health issues are associated with the entire process of waste management. Health issues can arise indirectly or directly: directly through the handling of solid waste during transporting and disposal, and indirectly through the consumption of water, soil, and food.

A big part of waste management deals with municipal solid waste, which is created by household activity. Waste disposal practices are not uniform among countries (developed and developing nations); regions (urban and rural areas), and residential and industrial sectors can all take different approaches. In many cities and towns, there is a public waste collection service which regularly collects household waste from outside buildings. The waste is loaded into a garbage truck and driven to a landfill, incinerator or crush facility to be disposed of. In some areas, each household has multiple bins for different categories of rubbish (usually represented by colors) depending on its suitability for recycling, which will instead be routed to a recycling center. Roadside waste collection is often done by means of larger metal containers of varying designs, mostly called dumpsters in the US, and skips in the UK. However, the functionality dumpsters and skips are somewhat different: while a skip is intended to be loaded onto a vehicle and transported, the contents of a dumpster are emptied into a garbage truck on site and the dumpster remains and its designated location.

The wheelie bin is the perfect waste container for multi-unit dwellings, estate and homes, materials handling, medical practice treatment rooms or as a commercial kitchen waste container. Wheelie bin or trash carts play a crucial role in the efficient management of residential waste and, to a lesser extent, commercial trash collection systems in most areas. These containers provide a convenient means of transporting waste from individual households to designated collection points. However, the challenge arises for many wheelie bin or trash cart users who reside in rural areas, where they often have to wait insistently for garbage collection trucks that help collect the waste in the bin to be transported to a dumping site, a further disadvantage is a when users have to traverse significant distances under unfavorable terrain to reach the collection point/dispose site and returning the empty containers back to their residences, typically on a weekly basis. This process can be tiring, stressful and time consuming under poor transporting mechanism, especially when users have multiple wheelie bins to be attended to.

FIELD OF INVENTION

This invention relates generally to vehicle attachments, in particular to a wheelie bin and refuge container transporting device and mechanism enabling a user to easily move a wheeled refuse container from loading location to a drop point.

DESCRIPTION OF RELATED ARTS

U.S Patent Application Publication of US20090283987A1, long et al. Discloses a device for transporting a wheeled garbage can, comprising: an L-shaped support member; a hitch connector carried by a first end of said L-shaped support member; and a can connector carried by a second end of said L-shaped support member, said can connector further comprising a plurality of pivotally mounted hooks.

U.S. Pat. No. 6,698,995B1 Bik et al. Discloses a hitch mountable refuse container transport device comprising: a hitch bar for mounting in a standard hitch receiver on a vehicle, the hitch bar having an upstanding stub at an end distal from the receiver; a vertical element removably carried by the stub; means for securing the vertical element to the stub; a telescoping mount received by the vertical element; a lead screw operably engaging the vertical element and telescoping mount for vertical translation of the telescoping mount; means for rotating the lead screw; and an engagement key attached to the telescoping mount and having a horizontal surface sized to be received within a recessed portion on the refuse container and engage a lip on an upper periphery of the recessed portion and a notch vertically spaced below the horizontal surface to receive a restraining bar horizontally mounted across the recessed portion.

U.S. Pat. No. 7,614,637 B1 to Alan D. Kidd discloses a refuse container hitching device including a horizontally extending hitch insert, a vertically extending vertical member of adjustable length, a horizontally extending top member, a refuse container support plate that extending downwardly from the top member, and at least one locking strap for locking the handle of a refuse container to the support plate during towing.

U.S. Pat. No. 9,789,741 BI issued to Kurt D. Marling discloses a vehicle tow device for wheeled containers preferably includes a hitch insert, an upright member, at least one support member and at least two retention members. The hitch insert preferably includes a U-shaped cross. The upright member preferably includes a U-shaped cross section and a horizontal flange extending from a top thereof. The hitch insert is attached to the upright member. Each support member includes a top flange and a side flange. Each support member is pivotally engaged with the horizontal flange. Each retention member includes a first retention flange and a second retention flange. Preferably, a bottom of the second retention flange is bent upward, substantially perpendicular to itself to form a non-pivot flange. A top of the second retention flange is bent to an acute angle to form a retention flange. The second retention flange is attached to a side flange of the support member.

U.S. Pat. No. 6,203,032 B1 to Victor Ramos. Discloses a carrier for refuse containers of the type having a front and a back, a top and a bottom, wheels located on the bottom back, and a cross bar located on the front midway between the top and bottom, comprising a longitudinal main beam and a plurality of cradles supported by the main beam. Each cradle is adapted to support one of the refuse containers from the bottom thereof. A locking mechanism includes a latch hook extending from the main beam centered with respect to the cradle to selectively lock onto the cross bar of the trash receptacle, and an operating handle extending alongside the cradle for engaging the latch hook.

U.S. Pat. No. 8,403,617B2 to Bradley Stephen Banning discloses a bin handling apparatus comprising a trailer having a pair of spaced chassis members defining a rear-opening space. A hoist assembly includes spaced support beams pivoted at pivots. The forward ends of the support beams are interconnected and support a hoist tower having a lift chain moving a tine carriage from which is cantilevered a pair of spaced lifting tines. A tipping ram serves to rotate the hoist assembly about the pivots. A headstock on the hoist tower has apertured bin engaging lugs. An open-topped bin assembly has a movable wall hinged to the upper, rear edge and forming a closure which can be locked in the closed position by latches. The front wall of the bin has engagement lugs with apertures adapted to align with the apertures in the bin engaging lugs, and be retained by an elongate steel pin.

US. Patent Application No: US20050161906A1 to Brian Thelen discloses a vehicle-mounted transport assistance device for towing a large, wheeled refuse container, comprising: a main support structure for providing a mechanical connection from a vehicle to said refuse container; a hook on said support structure adapted to positively grip an element on said refuse container; a positive locking device integral to said hook; and a transverse snubber bar on said support structure.

U.S. Pat. No. 6,164,896A to Robert L. Cummins discloses a trash container lifting device adapted for attachment to a motor vehicle for lifting and transporting a filled trash container to a remote site for pickup. The lifting device includes a supporting frame which is attached to the motor vehicle, such as a pickup truck, sport utility vehicle or the like without tools or attaching hardware.

There are deficiencies in the Bik and Kidd design, as well as other prior arts majorly in the areas of capacity and secured mechanism for attaching one or more wheeled refuge bins to a car or truck. The present invention explores various embodiments taking into account different refuge container sizes, vehicle types, and user preferences. It considers factors such as weight distribution, towing capacity, and maneuverability, ensuring compatibility with a wide range of vehicles and wheeled bin container configurations. This versatility allows users to adapt the invention to their specific needs and circumstances, enhancing its practicality and overall usefulness.

SUMMARY OF THE INVENTION

The following summary is provided to facilitate an understanding of some of the innovative features unique to the present invention, this is not intended to be a full description. A full description of the various aspects of the invention can be gained by taking the entire specification, claims, and abstract as a whole.

It is an object of the present invention to provide a vehicle towing device and mechanism for wheelie bin that connects a vehicle to one or more wheeled refuse containers and secured safe for transporting. The wheelie bin handle allows for manual tilting, enabling the operator to distribute the weight between the wheels and the handle for easy movement comprises of: a plurality of refuse container locking mechanisms, a tee shaped assembly component formed of a round stock material, and a lower horizontal component formed of a rectangular shaped material to bind the vehicle to the tee shaped assembly component; it further consisting of two primary parts made from a metal preferably aluminum or a polymer like material which may be effectively mirror images of each other and rotate about the horizontal round stock arm of the Tee Assembly in opposite directions to each other concurrently to surround the refuge container handle to securely attach the refuse container to the Tee Assembly. Each of the two primary parts possess a similar but oppositely positioned slot that is wider than the refuse container handle and arched concentrically about a hole on both primary parts in which the parts concurrently rotate in opposite direction around the horizontal round stock leg of the Tee Assembly to achieve a fully surrounded capture of the refuse container handle. An additional, or alternative means of securing or binding the refuge containers to the invention such as straps, clamps, brackets and the like are completely eliminated by the present invention design and are not a necessary embodiment of this invention. The invention aims to provide a secured, practical method and mechanism to securely attach the tilted refuse container(s) to the device using a wheelie bin vehicle towing device further binds the device to the vehicle using a lower horizontal component. This component can utilize the vehicle's towing receiver or be adapted for other attachment methods. The invention enhances safety, security, and usability for the operator while protecting the interfaced assets. It primarily consists of container to interface binding mechanisms, a tee-shaped intermediate assembly, and a lower horizontal component for connecting the vehicle to the device assembly. The interface device described in this invention ensures that the connection between the refuge containers and the vehicle is robust and secure, minimizing the risk of detachment or accidents during transit. It incorporates durable materials and design that can withstand the rigors of transportation on varying terrains. The present invention also features an effective securing mechanism, ensuring that no waste spill or decoupling can occur during transit. It further provides for optional locking features. Furthermore, the invention is easy to assemble and use, making the process of attaching and detaching the refuge containers from the vehicle as effortless as possible. It incorporates intuitive mechanisms, such as quick-release systems and easily adjustable fasteners, enabling wheelie bin refuge container users to conveniently attach and detach the refuse containers without requiring extensive manual effort or specialized tools.

BRIEF DESCRIPTIONS OF DRAWINGS

DETAILED DESCRIPTION OF THE PREFERRED EMBODIMENT

The present invention will be further described below with reference to the accompanying drawings.

The present invention vehicle towing device and mechanism for wheelie bin containers from a loading point to an offloading point. The unique features of the present invention are its convenience, and the elimination of unnecessary work for dragging a wheeled refuge container. The device allows for easy transporting of a refuse container behind a motor vehicle for the full length of a long driveway and thus save time and effort for the user.

Figure 1:
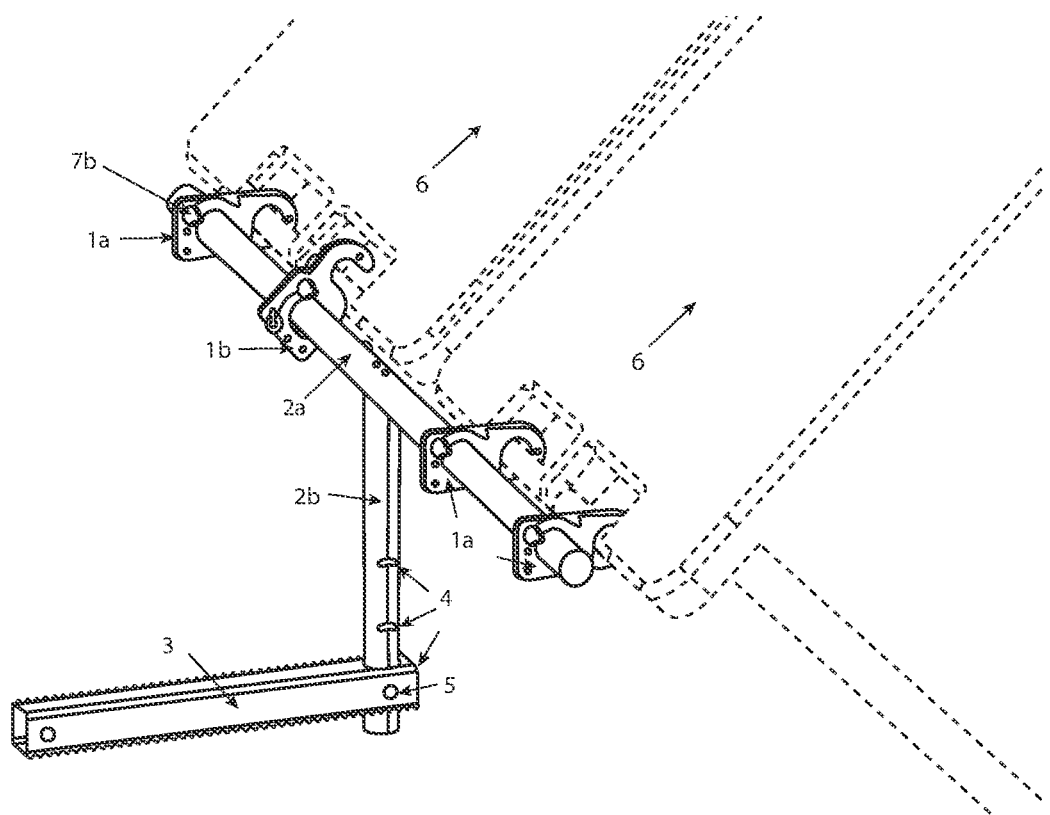
FIG. 1 is a perspective view of the vehicle towing device and mechanism for wheelie bin attached to wheelie bin(s)

With reference now to the drawings, and particularly to FIG. 1, there is shown a perspective view of a wheelie bin vehicle towing device and mechanism attached to the wheelie bin(s) or refuge containers. The vehicle towing device and mechanism for wheelie bin preferably includes a locking assembly in the closed & ready to tow position (1a), in the open & ready to receive the container position (1b), a Horizontal Arm of the Tee Assembly (2a), a Vertical Leg of the Tee Assembly (2b), the Tee shaped assembly component formed of a round stock material, and a lower horizontal component formed of a rectangular shaped material to bind the vehicle to the tee shaped assembly component; a Lower Horizontal component (3), a plurality of rotationally Limiting self-centering Slot(s) (4), a Rotationally limiting Pin (5), Refuge Container to Interface Attaching Mechanism Locking Device in open position (7b) attached to a Refuge container(s) (6).

Figure 2A:
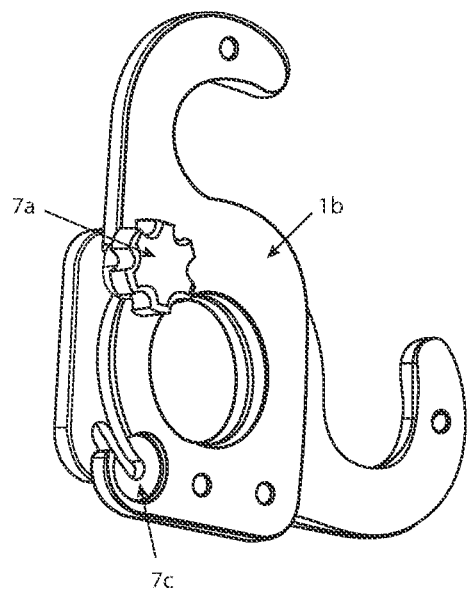
FIG. 2 is an illustrative view of the lock assembly of the vehicle towing device and mechanism for wheelie bin, illustrating the concentric radial path of the locking device & refuge container handle capture slots.
Figure 2B:
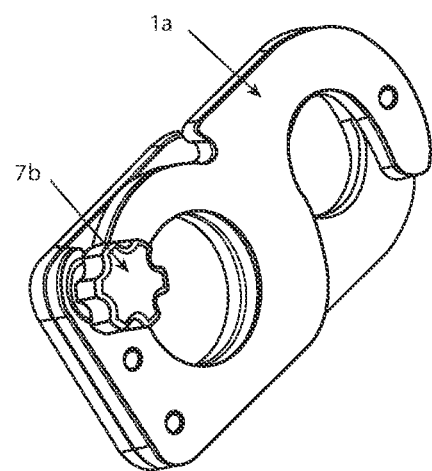
Figure 2C:
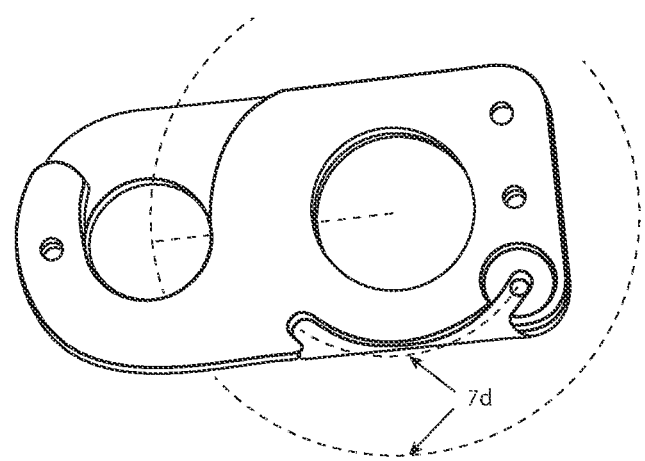

With reference to FIG. 2, there is shown the vehicle towing device and mechanism for wheelie bin locking device. FIG. 2a shows the locking device (1b) in a receiving state, and further reveals the tightening knob for securely affixing the locking device to the horizontal arm of the Tee Assembly and secured further to the wheelie bin container handle to securely attach the refuge container to the Tee Assembly. In an open position, the knob (7a) sits in an upper position revealing the mechanism Locking detent as seen in (7c) to ensure it cannot slide out of the locked position. FIG. 2b shows the locking device (1a) in a closed position, and further reveals the tightening knob (7b) in the counter sunk position, ensuring that the knob does not slide out of the position. In FIG. 2c discloses the wheelie bin vehicle towing device and mechanism locking device concentric radial path around the Horizontal Tee assembly as illustrated in the movement shown in 7d.

Figure 3:
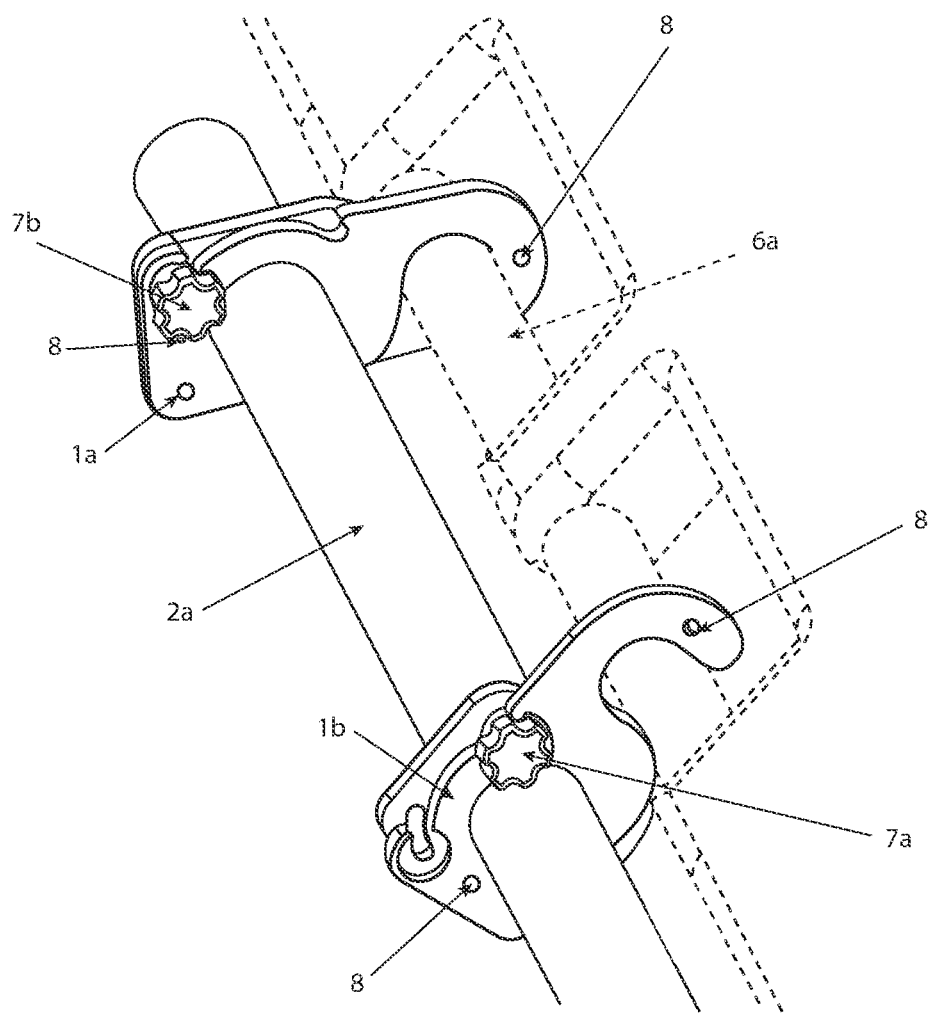
FIG. 3 is a perspective view of the vehicle towing device and mechanism for wheelie bin showing the locking assembly in the receiving and locking position.

FIG. 3 reveals the locking device of the vehicle towing device and mechanism for wheelie bin, preferably includes the horizontal Tee assembly (2a), which is securely attached to the locking device. The locking device is further revealed in a closed & ready to tow position (1a), in the open & ready to receive the container position (1b), the knob (7b) on the locking device is seen in the closed and tight position and used to secure the lock device to the Horizontal Tee assembly (2a) and further attaches to the handle of the Wheelie bin refuge container (6a). The knob (7a) as seen on the locking device in an open and ready to receive position further revealing the concentric radial path of the knob when not tightened to the Horizontal Tee assembly. A plurality of optional holes for padlock or other secondary locking device (8) are also revealed.

Figure 4:
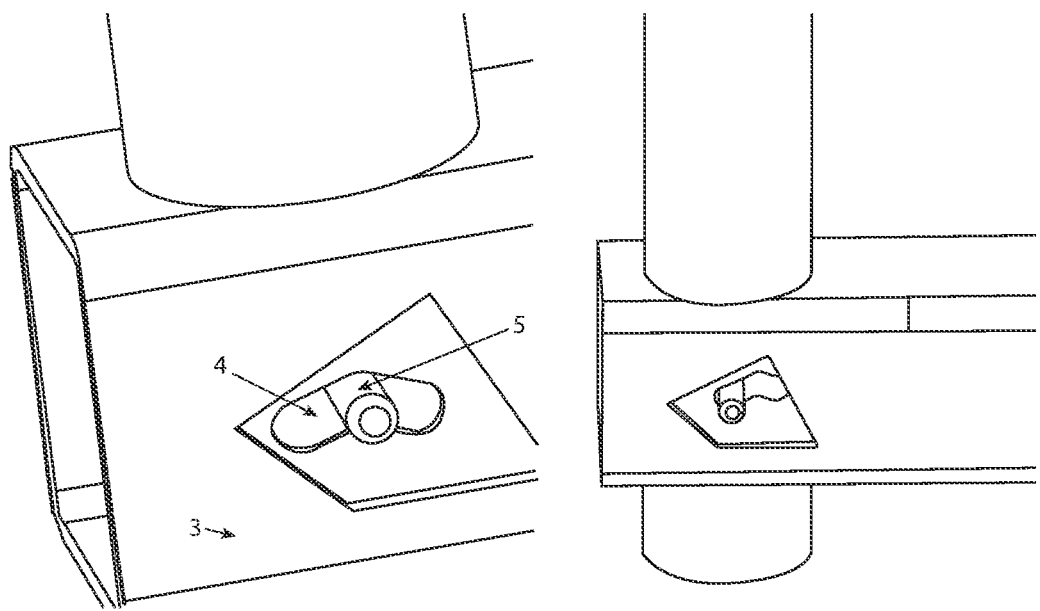
FIG. 4 is a cut cross sectional view of the Lower Horizontal Component of the vehicle towing device and mechanism of the wheelie bin showing the Rotationally Limiting Pin & Slot(s)

FIG. 4 is a cutaway section of the Lower Horizontal Component (3), revealing the rotationally Limiting Pin (5), and rotationally Limiting self-centering Slot(s) (4).

Figure 5:
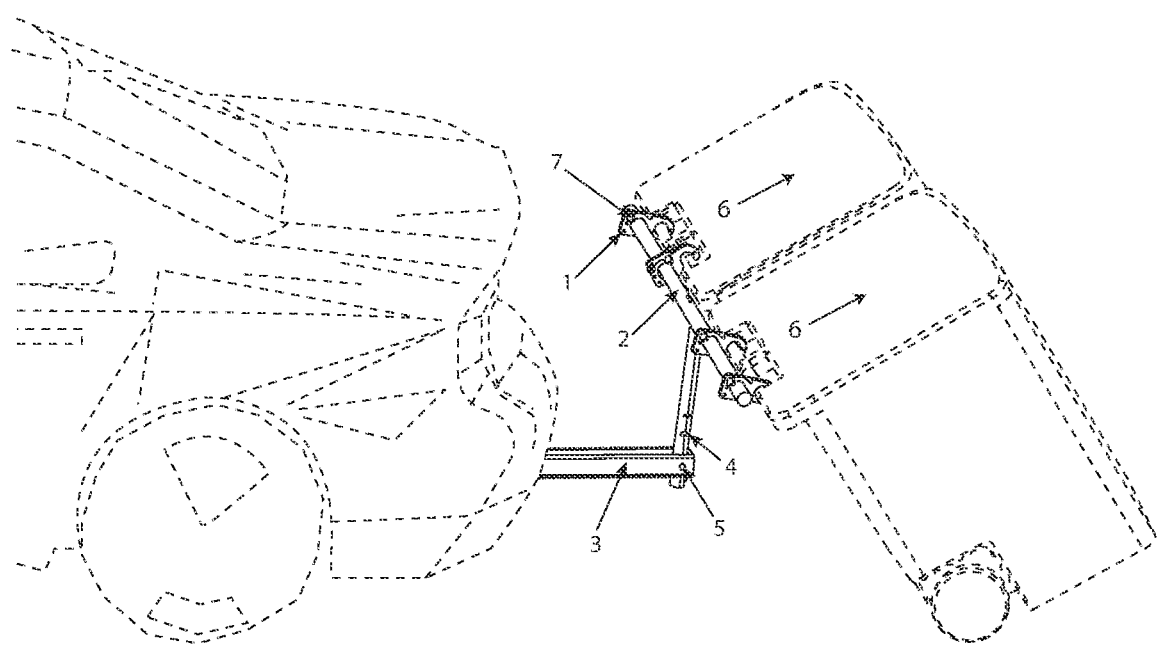
FIG. 5 is a side view of the vehicle towing device and mechanism for wheelie bin in accordance with the present invention, illustrating its usage.

FIG. 5 is an illustrative view of the vehicle towing device and mechanism for wheelie bin in accordance with the present invention illustrating its usage when secured to a transport car/truck.

The basic principles, main features, and advantages of the present invention are shown and described above. It should be understood by those skilled in the art that the present disclosure is not limited by the foregoing embodiments, and the foregoing embodiments and the description are merely illustrative of the principles of the present disclosure, and without departing from the spirit and scope of the present disclosure, simple changes and substitutions of those skilled in the art are within the protection scope of the present disclosure.

The invention claimed is:

1. A vehicle towing device and mechanism for a wheelie bin comprising:
   a tee shaped assembly component includes a horizontal arm and a vertical leg, said horizontal arm rigidly attached to a vertical leg which is in turn constrained about the vertical leg of this tee assembly to a lower horizontal component, the tee shaped assembly component is formed of a round stock material, and the lower horizontal component formed of a rectangular shaped material;
   the lower horizontal component consisting of tubing made of metal or a polymer material and having multiple horizontal holes to facilitate attaching the forward end to the vehicle with a pin or threaded hardware, or via the vehicles trailer hitch receiver;
   a self-centering rotationally limiting slot and a rotationally limiting pin; wherein said limiting pin limits the extent of rotation and support of the tee assembly about the lower horizontal component, the rotationally limiting slot having a "chevron" or "arched" shape for the rotational limiting pin to travel allowing the force of gravity to affect the tee assembly in a manner as to be rotated to or remain perpendicular to the vehicle's axis of travel further avoiding the tee assembly from rotationally wondering when not attached to refuge containers and to a lesser extent while transporting wheelie bin or wheeled refuge containers;
   said limiting slots can alternately be located on the lower horizontal component with a concentric hole to confine the rotationally limiting pin in the tee assembly vertical leg, there are a multitude of rotational limiting slots to accommodate vertical adjustment of the tee assembly relative to the lower horizontal component to change the angle of the refuge containers as needed or preferred by the operator;
   a refuge container to interface attaching mechanism consisting of two primary parts made from a metal or a polymer material which may be effectively mirror images of each other and rotate about the horizontal round stock arm of the tee assembly in opposite directions to each other concurrently to surround a refuge container handle to securely attach a refuge container to the tee assembly; each of the two said primary parts possessing a similar but oppositely positioned slot that is wider than the refuge container handle and arched concentrically about a hole on both primary parts in which the parts concurrently rotate in opposite direction about the horizontal round stock leg of the tee assembly to achieve a fully surrounded capture of the refuge container handle;
   a locking mechanism consisting of: a shaft that may be threaded and fixedly attached to one of the two primary parts of the said refuge container to interface attaching mechanism and further includes a hand tightened knob or lever device attached to the shaft in a manner that allows the binding or locking of the two primary parts of the refuge container to interface attaching mechanism, said knob or lever is rotated either in a open ready to receive the refuge container position or a closed fully locked and secured ready to tow position.

2. A vehicle towing device and mechanism for a wheelie bin as in claim 1 wherein the locking mechanism follows a guided path on one of the two primary parts that is radially concentric to the hole occupied by the horizontal arm of the tee assembly to allow rotation of the primary parts about the horizontal round stock arm of the tee assembly from the closed position to the open position without interference.

3. A vehicle towing device and mechanism for a wheelie bin as in claim 2 wherein closing of the locking mechanism will allow for a detent or recess in the second primary part to add an additional level of locking security such that when the locking mechanism is tightened in the closed position it would be positioned below the mean surface of the second primary part to resist sliding to the open position, if the refuge container to interface attaching mechanism experiences excessive loading during transit.

4. A vehicle towing device and mechanism for a wheelie bin as in claim 1 wherein a locking mechanism contains a plurality of holes in the refuge container to Interface attaching mechanisms to facilitate a secondary locking device, when the two primary parts of the refuge container to interface attaching mechanism(s) are in the closed position and aligns correspondingly to the holes on both primary parts to receive the secondary locking device.

5. A method of compliance between the wheelie bin and vehicle towing device and mechanism for a wheelie bin as in claim 4, wherein when the refuge container to interface attaching mechanism is in the closed position, a circular bearing surface is formed about the wheelie bin handle to allow a degree of vertical rotational freedom about the wheelie bin handle, wherein the horizontal arm of the tee assembly is captured by the refuge container to interface attaching mechanism via an additional set of circular bearing surface holes forward of the captured wheelie bin handle circular bearing surface hole which captures the horizontal arm of the tee assembly allowing a vertical degree of rotational freedom about the axis of the tee assembly horizontal arm.

6. A method of compliance between the refuge container(s) and vehicle towing device and mechanism for a wheelie bin as in claim 4, wherein a set of plurality vertical rotational axes embodied within the refuge container to interface attaching mechanism enables a level of compliance and suspension to minimize the negative effects of jerk generated by the wheelie bin refuse container(s) and the traveled path during transit.

* * * * *